United States Patent [19]

McAuliffe

[11] 3,736,414

[45] May 29, 1973

[54] TRANSVERSAL FILTER EQUALIZER FOR PARTIAL RESPONSE CHANNELS

[75] Inventor: Gerald K. McAuliffe, Mahopac, N.Y.

[73] Assignee: International Business Machines Corporation, Armonk, N.Y.

[22] Filed: June 30, 1971

[21] Appl. No.: 158,464

[52] U.S. Cl. ....................235/181, 325/38 A, 325/42, 328/18, 328/28

[51] Int. Cl. ............................H04b 3/14, G06g 7/19

[58] Field of Search .............................235/181, 183; 333/18, 28; 325/42, 38 A; 178/69 R, 69 A; 179/170.2; 328/162, 167

[56] References Cited

UNITED STATES PATENTS

| | | | |
|---|---|---|---|
| 3,553,606 | 1/1971 | Port | 333/18 |
| 3,609,597 | 9/1971 | Moye | 333/18 |
| 3,508,172 | 4/1970 | Kretmer et al. | 333/18 |
| 3,445,771 | 5/1969 | Clapham et al. | 325/42 |
| 3,447,103 | 5/1969 | Port | 333/28 |
| 3,477,043 | 11/1969 | Farrow | 333/18 |
| 3,597,541 | 8/1971 | Proakis et al. | 179/170.2 X |
| 3,573,624 | 4/1971 | Hartmann et al. | 325/42 |
| 3,573,622 | 4/1971 | Holzman et al. | 325/42 X |
| 3,508,153 | 4/1970 | Gerrish et al. | 325/42 |

FOREIGN PATENTS OR APPLICATIONS

| | | | |
|---|---|---|---|
| 1,184,653 | 3/1970 | Great Britain | 235/181 |

*Primary Examiner*—Felix D. Gruber
*Attorney*—R. R. Schlemmer, Jr.

[57] ABSTRACT

The present invention relates to a fast converging transversal filter equalizer for partial response channels including a multi-tap delay line. In the preferred embodiment the equalizer multiplies an error signal and a recreated signal as received by the equalizer. The multiplier outputs in turn feed integrators whose outputs represent correlation functions which control the gain from a series of delay line tap outputs, the summation of the tap outputs comprising the output of the equalizer. In a further embodiment of the invention, the error signal is correlated with the tap outputs themselves and the outputs of the correlators control the tap outputs from the delay line to produce the final output signal in a different configuration.

10 Claims, 9 Drawing Figures

INVENTOR
GERALD K. McAULIFFE

BY
[signature]
ATTORNEY

TRANSVERSAL FILTER EQUALIZER FOR PARTIAL RESPONSE CHANNELS

This invention was made under a government contract with the United States Army.

BACKGROUND OF THE INVENTION

In modems for data transmission, partial response techniques enable binary digits to be transmitted at the Nyquist rate using realizable and perturbation tolerant filters (R. W. Lucky, J. Salz and E. J. Weldon, Jr., "Principles of Data Transmission," McGraw-Hill, 1968, pp. 83–92). This is achieved at the expense of introducing extra levels, three instead of two, for example, in the common class 4 case (E. R. Kretzmer, "Binary Data Communication by Partial Response Transmission," *IEEE ICC*, 1965, pp. 451–455). The theoretical penalty for introducing these extra levels is not as large as might first be supposed, because the upper levels are occupied less frequently than the lower ones. In the binary to ternary case, the loss is only 2.1 db.

Partial response modems, however, possess many advantages other than excellent bandwidth utilization. The class 4 scheme, for example, has nulls in its spectrum at zero and at 1/2T Hz, where T is the symbol spacing or period. This makes the use of pilots for carrier and bit timing recovery easier. Also, the absence of a dc component makes single rather than vestigial sideband practical.

Equalization of channel imperfections such as delay distortion is frequently necessary in order to achieve satisfactory error rates. The conventional Lucky algorithm (R. W. Lucky, "Automatic Equalization for Digital Communication," *Bell Systems Technical Journal*, Vol. 44, pp. 547–588, April 1965) is not suitable for partial response techniques. Other experimenters have disclosed and built adaptive equalizers which use fixed increments to the tap weights based on the sign of the "error." These approaches sacrifice speed of tap adjustment in order to achieve extreme simplicity.

The equalization described herein attempts to achieve faster tap adjustment with as little extra complexity as possible. It is adaptive, i.e., learning can proceed concurrently with data transmission. In the preferred embodiment it uses zero forcing, but with increments which depend on the magnitude of the error. Computer simulation has shown speed improvement by a factor of up to 10 for typical switched network lines. The essential features of such a technique are presented subsequently with specific reference to class 4 partial response systems.

SUMMARY AND OBJECTS OF THE INVENTION

It has been found that a greatly improved equalizer for use with partial response channels is realizable by effectively making error measurements on the combined partial response equivalent filter plus the channel, but equalizing only the channel itself. An error signal is developed by comparing the demodulated channel signal with a reconstructed signal. This error signal is then used to control equalizer adjusting means which in turn control the amount of the tap signal fed to the final output of the equalizer. The equalizer adjusting means includes a series of correlators, each of which includes multipliers having as one input, said uniquely developed error signal. The disclosed circuits, in effect, control the adjustments of said equalizer in a manner that is an approximation of a truncation of the inverse of the partial response operator $1-D^2$.

It is accordingly a primary object of the present invention to produce a transversal filter equalizer for partial response channels which produces very rapid convergence.

It is a further object to provide such an equalizer having minimum complexity.

It is yet another object to provide such an equalizer utilizing a uniquely developed correction signal to control the adjustment of the equalizer tap outputs.

It is yet another object of the invention to provide such an equalizer wherein said error signal is correlated with a recreated precoded signal, the output of said correlation in turn controlling tap adjustments.

It is a still further object to provide such an equalizer wherein the error signal is correlated with a plurality of tap outputs from the equalizer filter to effect said equalizer adjustments.

It is yet another object to provide a special decoding circuit to prevent errors due to start-up data ambiguities at the receiver attendant with certain time delay functions of the precoding operation.

The foregoing and other objects, features and advantages of the invention will be apparent from the following more particular description of preferred embodiments of the invention, as illustrated in the accompanying drawings.

DESCRIPTION OF THE PREFERRED EMBODIMENTS

Figure 1:
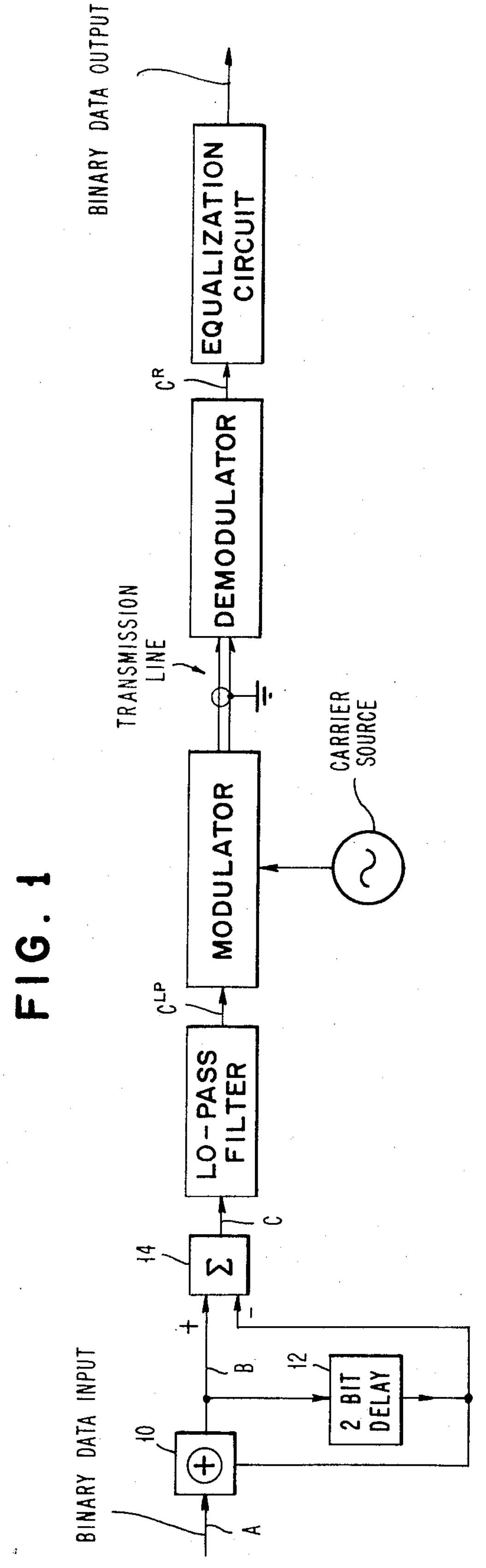
FIG. 1 comprises a functional block diagram of an overall data transmission system including a partial response channel.

The objects of the present invention are accomplished in general by a transversal filter equalizer for a partial response channel comprising a multi-tap filter means for receiving data from a partial response channel. Detection means are provided to convert the partial response coded data from the equalizer filter into conventional binary data format. Means are connected to the output of said detector for recreating the partial response coded data format and the recreated data format is compared with the actual received data signal providing the input to said detection means. The output of the detection means provides an error signal. The error signal is applied to a correlation means, the outputs of which means control the plurality of adjustable means connected to the taps of the filter wherein the composite effect of said adjustments is an approximation of the inverse of the partial response operator $1-D^2$.

The overall circuit is comprised of a filter portion which in the preferred embodiment comprises a delay line which is tapped at points along said delay line 1 bit width distant. These taps are each passed through separate gain control or adjusting means which are controlled by the output of the previously specified correlation means. The output of said gain control means is placed on an output line which in turn feeds a conventional operational amplifier. It is the output of the operational amplifier which in essence comprises the output of the present equalizer filter subject, to a precoding detection operation which converts it from the partial response coded format into conventional binary format.

The other principal portion of the present circuit includes the above-mentioned detector and includes a means for recreating the partial response coded data format from the output of said detector to finally produce an error signal. Also included in this section of the circuitry is a circuit for avoiding errors in the recreated signal due to a time delay feedback loop built into the precoder portion of the partial response encoding circuit as will be set forth subsequently.

According to the preferred embodiment of the invention, the error signal is multiplied by the precoded signal from said re-creation circuit means and the output of these multipliers is sent to a series of integrators, the outputs of which in turn control the aforementioned gain control means which are in circuit relation with the various taps on the delay line. A necessary feature of the present circuit is that the outputs of the multipliers, in addition to feeding the particular integrator with which they are directly associated, also propagate forward to feed subsequent sets of integration circuits so that certain of said integration circuits have plural inputs.

According to a slightly different embodiment of the invention, the error signal is multiplied by the actual tap outputs of said delay line instead of the re-created precoded signal and again the outputs of the multiplier circuits feed a series of integrators whose outputs in turn form the correlated correction signal and control the aforementioned adjustable gain means connected between tap points of the delay line and the output line connected to the input of an operational amplifier. In this embodiment the output of the ith multiplier circuit means provides an input to all $i+2, 4, 6 \ldots$ integration circuit means. Thus, the output of the first multiplier circuit means feeds the input of the first, third and fifth integration circuit means and similarly the output of the second multiplier circuit means feeds the output of the second, fourth, sixth, etc. integration circuit means.

Figure 2:
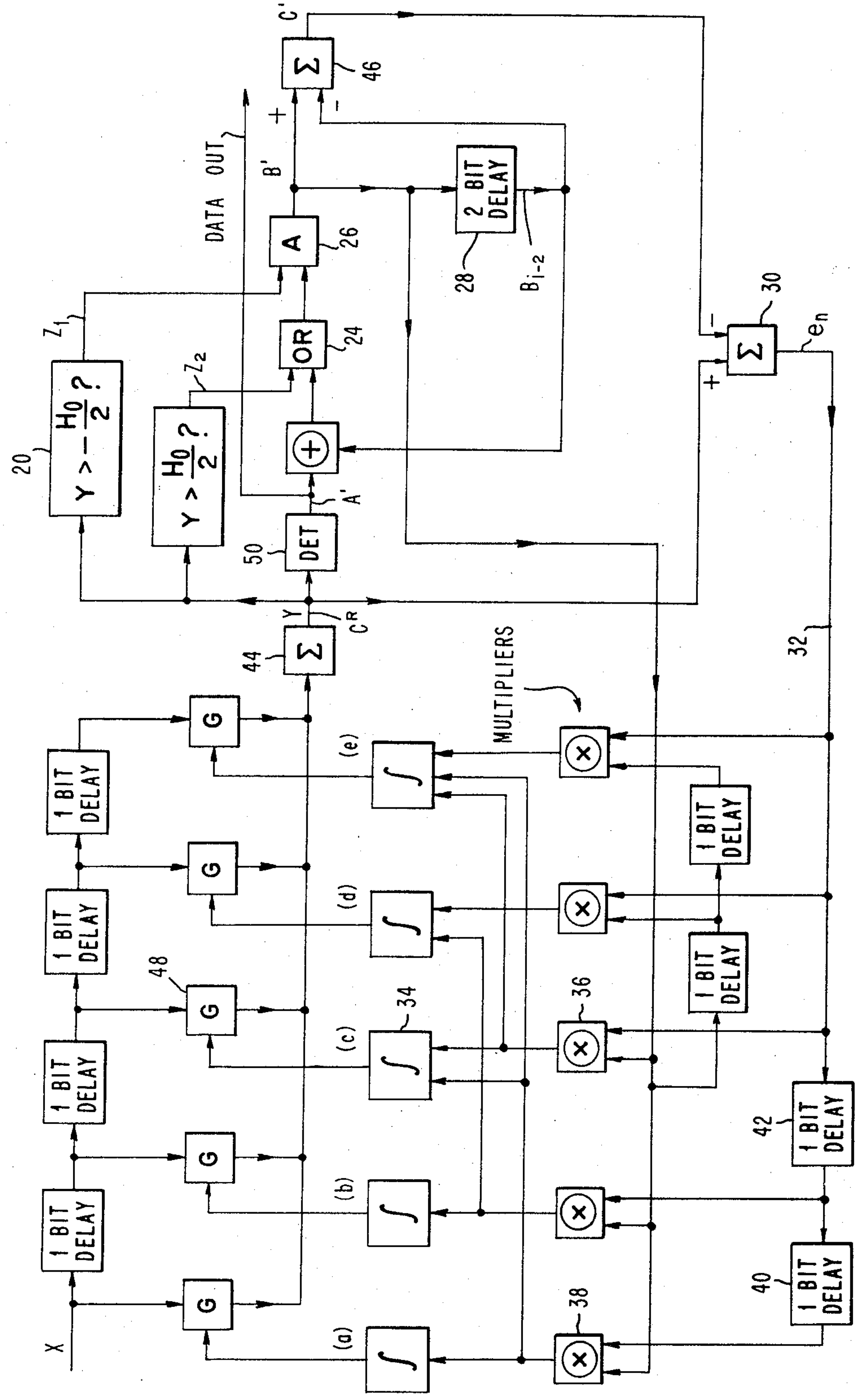
FIG. 2 comprises a detailed functional block diagram of the preferred embodiment of an equalization circuit incorporating the teachings of the present invention.
Figure 3:
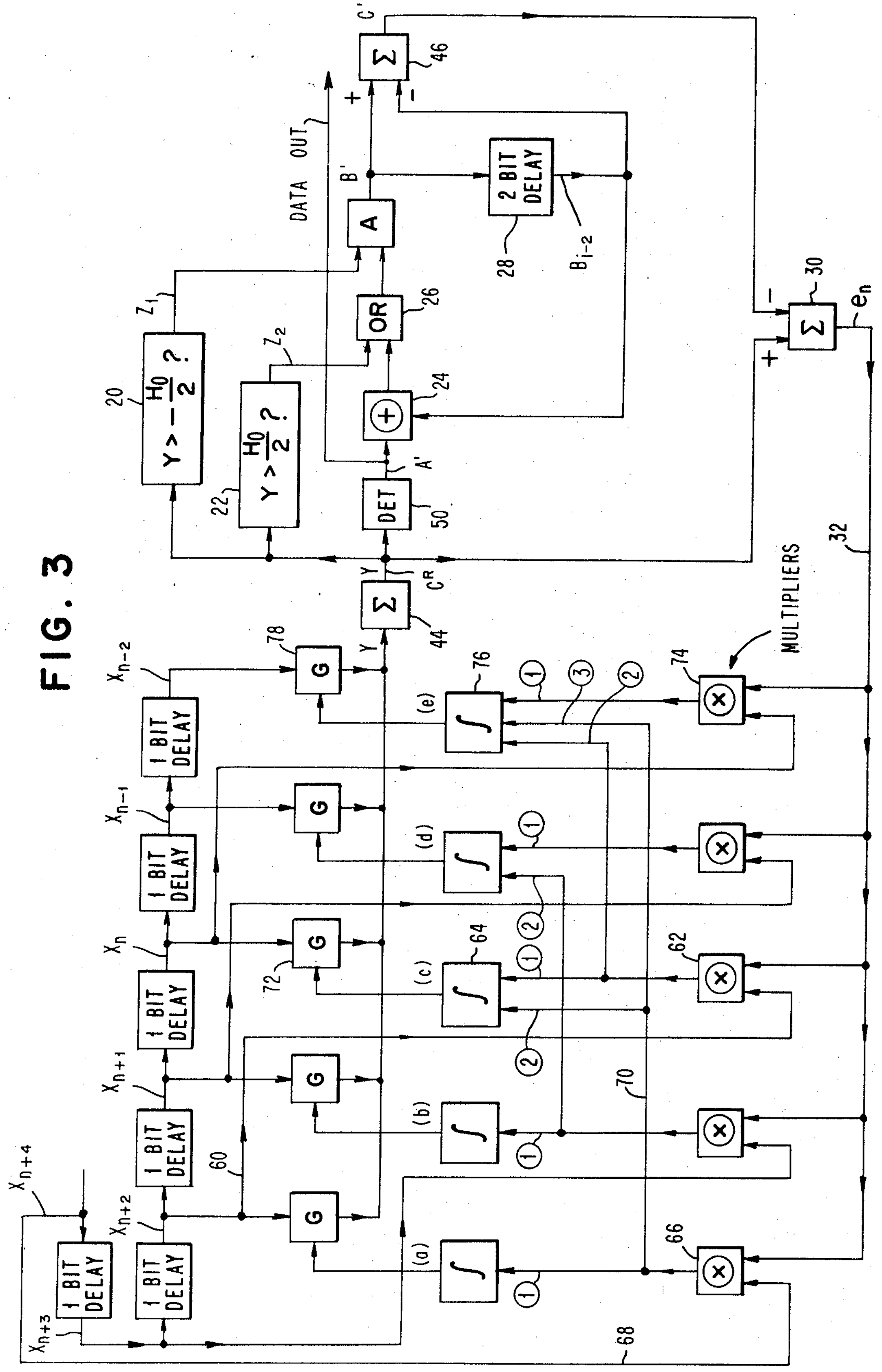
FIG. 3 is a detailed functional block diagram of an alternative embodiment of an equalization circuit incorporating the principles of the present invention.

Before proceeding with the description of the embodiments of FIGS. 2 and 3, reference should first be made to FIG. 1 in which an overview of such a partial response transmission system is set forth. Blocks 10, 12 and 14 comprise the transmitter section which encodes the original binary input data A, first into precoded form at B and finally into the partial response coded format at point C. The actual differences and distinctions between these three signals may be seen clearly referring to the wave forms of FIGS. 4A, 4B and 4C. The Lo-pass filter merely cleans up the wave form to that shown in FIG. 4D at which point it is passed onto the modulator where it is placed on a high frequency carrier which would assumedly utilize a single sideband modulation from which modulator the signal passes over some transmission medium and is ultimately received at the Demodulator Station which removes the carrier and produces the partial response coded data at point $C^R$. This signal is then passed through the equalization circuit means of the present invention which after suitable detection produces the final Binary Data Output A'. It will, of course, be understood that within the Equalization Circuit Block, the distortion introduced into the signal, see FIG. 4E, as a result of passing over the transmission line is essentially removed. It is therefore within the Equalization Circuit that the present invention resides.

The two disclosed embodiments of the invention set forth in FIGS. 2 and 3, as generally stated previously, are quite similar in overall form. However, in FIG. 2, the error signal is correlated with the re-created precoded signal from point B' whereas in the embodiment of FIG. 3, the error signal is correlated with the actual tap outputs of the delay line itself. In view of the somewhat different mathematical consequences of these two equalization approaches, the subsequent description of these figures will be set forth individually for clarity.

Figures 4A, 4B, 4C, 4D, 4E, 4F:
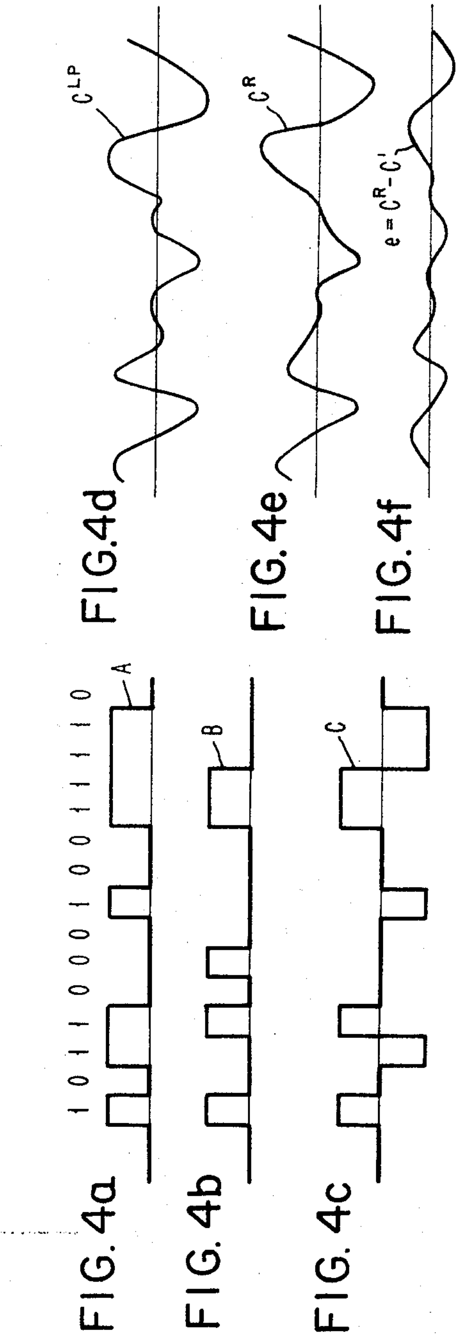
FIG. 4*a* to 4*f* comprise a series of wave forms illustrating the operation of the present equalization circuit and also the overall data transmission mode.

Referring briefly to the FIG. 4 and the wave forms shown therein, certain basic characteristics of the system will be apparent. Referring to FIG. 4*a* there is shown a conventional binary data format wherein the existence of a binary 1 is denoted for example by a positive voltage and a 0 by a zero voltage signal. It will be noted that this wave form is denoted by A which refers to the point on FIG. 1 at the transmitting station where the binary data is entered into the system. For practical purposes, the wave form at A' would be essentially the same as appears at point A. A' is shown in FIGS. 2 and 3. This, of course, is after the received pulse $C^R$ has passed through the Detector.

The wave form in FIG. 4*b* designated by B represents the original binary pulse train of 4*a* after it has passed through the precoder wherein the function $B = (A_i \oplus B_{i-2})$ operation which is the logical operation of precoding as described previously. It will, of course, be noted that the appearance of this data has changed materially. The reasons for the precoding have been set forth previously.

The wave form of FIG. 4*c* represents the effect of B passing through the partial response coding circuit described previously. At this point it will be noted that the precoded signal C is a three level signal having a positive swing, a negative swing and a zero point in the middle. The logical function performed in the partial response coding, it will be remembered, is as follows: $C = (B_i - B_{i-2})$.

Looking now at the wave form of FIG. 4*d* designated $C^{LP}$ there is an approximate representation of the wave form C after it has passed through the Lo-pass filter. It will be noted that this wave form somewhat approximates a sine wave, although it should be understood that this is not a true sine function. The wave form of FIG. 4*e* is that received at point $C^R$ after the wave $C^{LP}$ has been transmitted through the transmission medium and passed through an initial demodulator. As is apparent from the preceding description, there is a considerable amount of distortion in this wave form. It is this distortion which it is desired to eliminate by means of the present transversal equalization filter.

As stated previously, it will be remembered that wave form C' which is in effect combined with wave form $C^R$ in the present error signal generation circuit, very closely resembles the wave form A above. The results of summing (subtracting) the wave forms $C^R - C'$ to provide the error signal e is shown in FIG. 4f. It is this error signal e which is, of course, fed into the correlation and accumulation circuitry which will be described subsequently with respect to the specific description of FIGS. 2 and 3. It should be understood that the wave forms of FIGS. 4e and 4f are merely exemplary since the actual distortion in a given line would vary.

The following is a general description of the partial response techniques to which both of the disclosed embodiments of the invention have reference. When partial response class 4 techniques are used, each data pulse is followed by an echo opposite in sign and two units delayed in time. This can be achieved by the simple scheme of FIG. 1 (blocks 10, 12 and 14), using an actual delay or by the use of specially designed filters. Since the latter achieve the same ultimate result, only the former simple approach will be described. The Lo-pass filter is usually of "cosine squared" shape which does not affect the sampled values. In z-transform notation letting $D = z^{-1}$ $$C(D) = B(D)\ (1-D^2) \tag{1}$$

The magnitude of the transfer function of the delay and add circuits of FIG. 1 is easily shown to be 2 |sin $2\pi fT$|, which has nulls at frequency intervals 1/2T Hz starting from zero frequency. The Lo-pass filter cuts off most of the energy above 1/2T Hz without introducing intersymbol interference (ISI) in the sampled values of its output. The spectrum is confined below $(1+\alpha)/2T$ Hz, where $\alpha$ is typically 0.2

To avoid ambiguities and error propagation in the recovery of the data sequence from the set {C}, precoding (A. Lender, "Correlative Digital Communication Techniques," *IEEE COM*–12, December 1964, pp. 128–135) of the data sequence {A} is usually employed. If {A} is binary, for example, $$B_n = A_n \oplus B_{n-2} \tag{2}$$

where $\oplus$ denotes mod 2 addition. To recover the sequence {A}, it is then only necessary to interpret {C} mod 2 without reference to preceding values of {C}. The complete precoder (blocks 10 and 12) and partial response class 4 generator (blocks 12 and 14) scheme are shown on FIG. 1.

After modulation, transmission over the channel, and demodulation, the received set $\{C^R\}$, corresponding to {C}, is contaminated by intersymbol interference due to the channel. Let the z-transform of the channel impulse response (including the modem filters) be denoted R(D). The z-transform of the channel plus partial response generator will then be P(D) where:

$$P(D) = (1 - D^2)\ R(D) \tag{3}$$

Let the z-transform of the set of equalizer tap values be denoted by G(z). In all cases, two-sided z-transforms are assumed, and the coefficient of $D^o$ refers to the principal (usually the largest) value of the set $\{r\}$, the corresponding value of $\{p\}$, and the main tap corresponding to the set $\{g\}$. After the equalizer, one obtains for the overall transfer function (including partial response circuits) F(D):

$$F(D) = P(D)\ G(D) = (1 - D^2)\ R(D)\ G(D) \tag{4}$$

It is desired that this be simply $1 - D^2$. Hence, it is desired that $$G(D) = 1/R(D) \tag{5}$$

i.e., that the equalizer be such as to equalize the virtual "regular" channel which does not include the partial response circuitry. Usually equation (5) cannot be achieved perfectly, and one must be content to approximate it as best one can, in a way analogous to Lucky's zero forcing technique, for example.

P(D) is easily determined by correlating the recovered data sequence {B} with the "error" signals as will be shown later. Then R(D) can be determined using a truncated expansion of $1/(1 - D^2)$:

$$(1 + D^2 + D^4 + \ldots D^{2N})\ P(D) = (1 - D^{2N+2})\ R(D).$$

If $N$ is large enough, and if $R(D)$ is of finite length, $R(D)$ can be determined by truncating this expression, since it represents $R(D)$ less $R(D)$ delayed by $(2N+2)$ units. The conventional zero forcing approach can now be used to equalize for $R(D)$. This is the principle of the new partial response equalizer set forth in FIG. 2.

Before proceeding further with the description of the specific embodiments and the way in which the equalization signals are fed back into the equalizer circuit, it should first be noted that in both FIGS. 2 and 3 there is a section denoted by the blocks 20, 22, 24 and 26 which is provided in both instances to prevent errors in the recreated signal appearing at B' and thus at C' due to start-up of the system. As will be appreciated, blocks 20 and 22 are merely level detectors wherein Y is the amplitude of the signal $C^R$ appearing at the output of the equalizer. The value $H_0$ represents the amplitude of the maximum positive and negative voltages which would appear in the three level signal Y. Thus, if the system were set via the various amplifiers, etc. as will be appreciated to produce a final output level of +1 or −1 volt, then $H_0$ would be equal to 1. The necessity for this circuitry is that at the Receiver Station to re-create the signal sequence A', B' and C', it is necessary in order to correctly represent the actual sequence, to know $B_{i-2}$ since this bit is combined with bit $A_i$ to form $B_i$ in the precoder portion. At the Transmitting Station this is no problem since the initial data sequences are known or can be assumed to be some value. However, at the Receiving Station if the two bits stored in the two bit delay shown at 28 feeding the precoder circuit are incorrect, this will in effect perpetuate an error condition in B' and C'. The effect of these errors is overcome by the aforementioned circuitry including blocks 20, 22, 24 and 26 as is explained below.

As stated above, for the equalizer to function it is necessary to reconstruct accurately at B' the data, which was actually sent over the channel. This is done by using the precoder modified by blocks 20, 22, 24 and 26. The modification is necessary because B' is not a unique function of A'; it depends on the starting values stored in the two stage delay circuits 28 of the precoder. Furthermore, if an error should occur in B', it would thereafter be propagated indefinitely. In the binary case, the following table shows the corresponding values for B and $C^R$:

| Case | $B_{i-2}$ | $B_i$ | $C^R$ |
|---|---|---|---|
| 1 | 0 | 0 | 0 |

| | | | |
|---|---|---|---|
| 2 | 0 | 1 | 1 |
| 3 | 1 | 0 | −1 |
| 4 | 1 | 1 | 0 |

Thus if $Y_i$, corresponding to $C^R_i$, has been decided to have been zero, it is not possible to say whether $B'_i$ is 1 or −1 without reference to $B'_{i-2}$. But if $Y_i = -1$, $B'_i$ must be 0 and if $Y_i = z$, $B'_i$ must be 1. These conditions may be used to override the normal precoder operation at the receiver and prevent error propagation: $B = B' \vee z_2 \wedge z_1$ where $B'$ is the normal precoder result. This is shown on FIGS. 2 and 3. As will be appreciated, the blocks 20, 22, 24 and 26 perform this operation where the symbols Λ and V denote AND and OR operations, respectively. It will actually take a number of cycles before the code is true since cases 2 and 3 may be resolved absolutely but there is still ambiguity in cases 1 and 4. However, as will be appreciated, after a number of cycles, cases 2 and 3 will remove all inaccuracies.

Thus, the signal at C′ with the correction applied by blocks 20, 22, 24 and 26 is a true representation again in partial response code of the signal received $C^R$. These two signals may now be correctly applied to the operational amplifier 30 to produce a proper error signal e for use in the integrator and correlation section of the equalizer. Up to this point the description of the correction circuitry of the two equalizers is the same for both of the embodiments of FIGS. 2 and 3. The actual description of the two separate embodiments will now be presented.

DESCRIPTION OF THE EMBODIMENT OF FIG. 2

Before proceeding with the specific description of FIG. 2, it should be noted that this particular embodiment utilizes a form of equalization which is referred to as zero forcing. The following description sets forth the basis of the mathematical relationships which exist in such a system and the way that the proper corrective signal may be generated. The subsequent description of FIG. 2 indicates which sections, in effect, form the specific mathematical functions, or more specifically generate the mathematical and logical relationships set forth in the following descriptions.

The sampled values of the virtual "regular" channel will be denoted by $r_n$, and those of the "regular" channel plus equalizer by $h_n$. The corresponding signal sampled values during data transmission will be denoted by $x_n$ and $y_n$:

$$x_n = \sum_i c_{n-i} r_i$$

$$y_n = \sum_i c_{n-i} h_i$$

where $$c_n = b_n - b_{n-2}$$

and $$b_n = a_n \oplus b_{n-2}$$

The original binary data is denoted by $a_n$, and is assumed uncorrelated. Then the $b_n$ are also uncorrelated. Error signals $e_n$ are defined as the differences between the received samples $y_n$ and the $c_n$ transmitted into the channel:

$$\begin{aligned} e_n &= y_n - c_n \\ &= \sum_i c_{n-i} h_i - c_n \\ &\triangleq \sum_i c_{n-i} \Delta h_i \\ &= \sum_i (b_{n-i} - b_{n-i-2}) \Delta h_i \end{aligned}$$

where $\Delta h_n$ is defined thus:

$\Delta h_n = h_n$; where $n \neq 0$ $= h_0 - 1$; where $n = 1$

It is assumed that it is desired to force $h_0$ to 1 and $h_n$ for $n \neq 0$ to zero. Thus, it is desired to force all $\Delta h_n$ to zero.

Define the expected value of the product $b_n \cdot e_{n+k}$ by $m_k$:

$m_k = E[b_n\, e_{n+k}]$ $= \Delta h_k - \Delta h_{k-2}$

Using an obvious z-transform notation this becomes:

$$M(D) = (1 = D^2)\ \Delta H(D)$$

$$(1 + D^2 + D^4 + \ldots D^{2N})\ M(D) = (1 - D^{(2N+2)})\ \Delta H(D)$$

From this expression $\Delta H(D)$ can be determined as described earlier, and the conventional zero forcing algorithm can be applied as shown on FIG. 2. Since $D^{(2N+2)}\ \Delta H(D)$ is simply $\Delta H(D)$ delayed by $(2N+2)$ units, if $N$ is large enough the contributions from $D^{(2N+2)}\ \Delta H(D)$ will not overlap those from $\Delta H(D)$ itself and can therefore be ignored. Thus, $\Delta H(D)$ as required in the standard zero forcing algorithm can be derived as shown on FIG. 2. As a simple illustrative example, the number of taps shown is only 5, the "main" tap being in the middle. The algorithm used then is:

$$\Delta g_{-2} = -K\, b_n\, e_{n-2} \qquad \text{(a)}$$

$$\Delta g_{-1} = -K\, b_n\, e_{n-1} \qquad \text{(b)}$$

$$\Delta g_0 = -K[b_n\, e_n + b_n\, e_{n-2}] \qquad \text{(c)}$$

$$\Delta g_1 = -K[b_{n-1}\, e_n + b_n\, e_{n-1}] \qquad \text{(e)}$$

$$\Delta g_2 = -K[b_{n-2}\, e_n + b_n\, e_n + b_n\, e_{n-2}] \qquad \text{(e)}$$

where $K$ is a small constant provided by the integrator circuits in the embodiment.

Note that $b_{n-k}\, e_n$ is used instead of $b_n\, e_{n+k}$ for $k > 0$, since $e_{n+k}$ is not available. The structure is very little more complex than conventional zero forcing variable increment type. The summers controlling the tap gain settings merely have several inputs instead of one.

Referring now specifically to FIG. 2, it wil be noted that the error signal e is applied via line 32 to the correlation network. The combination of a multiplier (denoted by ⊗) and an integrator (denoted by ∫ ) form the correlator. Referring now briefly to the above formulas specifying the various $\Delta g$ or gain increments, it will be noted that the outputs of each of the integrators has a symbol adjacent thereto corresponding to one of these formulas. Thus, referring to the circuit formed by the integrator 34 and multiplier or correlator 36 that integrator 34 has an input both from multiplier 36 and also from multiplier 38. Referring now to formula (c) the symbols within the bracket refer to the two inputs to the integrator 34. It will be noted, referring to the drawing, that the output of multiplier 36 corresponds to $b_n \cdot e_n$. Similarly, the input to the multiplier 38 comes directly from the B' tap which corresponds to $b_n$ and the other input comes from line 32 which contains e passing through the two delay circuits 40 and 42 to provide the function $e_{n-2}$.

Following the same approach, the inputs to all of the other multipliers or correlators and also the integrators may be similarly traced from the drawing of FIG. 2.

It should also be clearly understood that in the embodiment of FIG. 2 the delay line has been shown to have only five taps and thus only the five formulas derived therefor for ease of description. In practice many more taps would normally be used which would give better equalization at the cost of additional hardware. It is believed that the expansion to form the new $\Delta g$ terms is quite obvious.

The blocks 30, 44 and 46, shown in the embodiment of FIG. 2 denoted by the symbol Σ are well known operational amplifiers wherein assuming two inputs $x$ and $y$, the output $z = x + y$. If two different polarities are specified, it will be apparent that the effect is to subtract the two signals appearing at the input. The multipliers and integrators such as 36 and 34 comprise the correlation circuit means and perform the function $z = \int x \cdot y\, dt$, as will be well understood by those skilled in the art.

The integrators such as 34, assuming for example three inputs $x$, $y$ and $z$, perform the functions $z = \int (x + y + z)dt$. Thus, in essence, these circuits are merely averagers as are well known in the art.

The various gain controls connected to the taps denoted by the symbols $g$, and as exemplified by the block 48 controlled by integrator 34, in effect mutliply the input from the tap by the gain control setting, thus $z = x \cdot g$.

Finally, the Detector indicated as DET and by reference number 50, converts the partial reponse coded data $C^R$ back into standard binary format in accordance with the following truth table.

TRUTH TABLE

| Input | Output |
|---|---|
| $C^R > ½$ | $a = +1$ |
| $-½ < C^R < ½$ | $a = 0$ |
| $C^R < -½$ | $a = 0 + 1$ |

Thus as indicated in FIG. 2, the Detector 50 re-creates the original binary signal A'. The circuit disclosed in FIG. 2 provides a new fast convergent partial response adaptively equalized modem design. It uses increments proportional to the "error" and thus converges much faster than conventional modems which use fixed increment techniques. In spite of this, only a very small penalty is paid in the form of extra hardware.

DESCRIPTION OF THE EMBODIMENT OF FIG. 3

It should first be noted, referring to FIG. 3, that the essential hardware elements of FIG. 3 are exactly like those of FIG. 2 with the exception of the fact that correlation is between the error signal $e$ and the signals of the taps of the delay line and that the inputs to the integrators ∫ are weighted as noted. Thus, a①denotes a weighting of 1, a②a weighting of 2, a③a weighting of 3, etc. This may be accomplished by a simple resistive network in the input circuit of the integrator. The contents of each functional block are the same as in FIG. 2 described previously.

Before proceeding with the specific description of the circuitry of FIG. 3, the following description of the mathematical relationship is presented. The error signal $e_n$ is correlated with $x_n$ instead of with $b_n$ as in the previous case. The symbols used in the following description are essentially the same as used for the description of the embodiment of FIG. 2.

The signal $x_n$ is given by:

$$x_n = \sum_i c_{n-i} h_i$$

By substitution this becomes:

$$x_n = \sum_i (b_{n-i} - b_{n-i-2}) h_i$$

The error signal is, as before:

$$e_n = \sum_i (b_{n-i} - b_{n-i-2}) \Delta h_i$$

The expected value of the product $x_{n-k}\, e_n$ is defined as $m_k^p$ where $$m_k^p = E[x_{n-k}\, e_n]$$

$$= E\left[\left\{\sum_i (b_{n-i-k} - b_{n-i-k-2}) h_i\right\}\left\{\sum_j (b_{n-j} - b_{n-j-2}) \Delta h_j\right\}\right]$$

Because the $b$'s are uncorrelated, this becomes:

$$m_k^p = -\sum_i (\Delta h_{i+k-2} - 2\Delta h_{i+k} - \Delta h_{i+k+2}) h_i$$

Expressed in z-transforms ($z^{-1} = D$) this is:

$$M^p(D) = -H(D)\, \Delta H(D)\, \{D^{-2} - 2 + D^2\}$$

When partial response techniques are not used, the corresponding results are:

$$m_k = \sum_i h_i \Delta h_{i+k}$$

or in z-transforms $$M(D) = H(D)\, \Delta H(D)$$

Thus, $$-D^2\{1 + 2D^2 + 3D^4 + 4D^6 + \ldots ND^{2N-2}\}\, M^p(D) = H(D)\Delta H(D)\{1 - (N+1)D^{2N} + ND^{(2N+2)}\}$$

If $N$ is large enough so that the components of:

$$\sum_i h_i \Delta h_{i+k}$$

delayed by at least $2N$ units do not overlap the original ones, the desired $$\sum_i h_i \Delta h_{i+k}$$

can be obtained as shown in FIG. 3, as is evident from this expression. Note he extra two bit delays and the sign change as indicated by the $-D^2$. The successive integrators have 1, 1, 2, 2, 3, 3, . . . inputs with weights of 1, 1, 2, 2, 3, 3, . . . , as shown. In the simple illustrative example shown, only five taps are used. Then, $$\Delta g_{-2} = Ke_n\ x_{n+4} \quad \text{(a)}$$

$$\Delta g_{-1} = Ke_n\ x_{n+3} \quad \text{(b)}$$

$$\Delta g_0 = ke_n\ (x_{n+2} + 2x_{n+4}) \quad \text{(c)}$$

$$\Delta g_1 = Ke_n\ (x_{n+1} + 2x_{n+3}) \quad \text{(d)}$$

$$\Delta g_2 = Ke_n\ (x_n + 2x_{n+2} + 3x_{n+4}) \quad \text{(e)}$$

Thus, as with the prior description of the embodiment of FIG. 2, the above derived formulas (a), (b), (c), (d) and (e), set forth the methematical or quantitative functions which must be provided to control the gain settings for the gain blocks G attached to the last five tap points on the delay line of the embodiment of FIG. 3. As will be remembered, these adjustable gain controls are identical to those of the circuit of the embodiment of FIG. 2. Also, as with the embodiment of FIG. 2, the disclosed embodiment of FIG. 3 shows the delay line as having a total of seven tap points, five of which are adjustably controlled; however, it whould be clearly understood that the particular number of taps on the delay line chosen for this embodiment is for illustrative purposes only and that in reality, and in all probability, many more tap points would be used in order to obtain a more perfect equalization. Obviously, the penalty paid for faster convergence is the requirement of additional hardware.

Similarly, the above mathematical description represented by the five above formulas may be readily expanded for as many tap points as it is desired to use, as will be apparent to one skilled in the art.

Referring now specifically to FIG. 3, as stated previously, the section of the present system appearing generally in the right-hand portion of the figure comprising the means for re-creating the signals A', B' and C' from the received signal set $C^R$ and including the ambiguity or error correcting blocks 20, 22, 24 and 26 is identical to that for the embodiment of FIG. 2. Similarly, the means for obtaining the error signal $e_n$ is exactly the same. As generally stated previously, the primary differences in this embodiment occur in the actual correlation circuit area including the interconnection of the multipliers and integrators. Additionally with this embodiment, instead of correlating the error signal with the re-created signal B' the error signal is correlated directly with the tap outputs.

As with the formulas and description of the embodiment of FIG. 2, the previously enumerated formulas (a), (b), (c), (d) and (e) above, set forth the source of the signals for the $\Delta g$'s. It should be noted in passing that the constant K for the embodiment of FIG. 3 is positive whereas that for FIG. 2 was negative. This implies that the direction of the increment with the embodiment of FIG. 3 will normally be positive whereas in that of the embodiment of FIG. 2 the increment was negative. Thus, the original gain setting will be appropriately reduced.

Referring first to formula (c) which is essentially the midpoint adjustable gain means, it will be noted that this signal is produced by correlating the error signal $e_n$ which appears again on line 32 with the signal $x_{n+2}$ which is transmitted via line 60 to the mutliplier box 62. The output of multiplier 62 provides an input weighted 1 to the integrator block 64. The formula (c) also states that to this the additional function $e_n \cdot 2x_{n+4}$ must provide a further input to the block 64. Referring now to block 66, it will be noted that one input to this multiplier is the $e_n$ signal and the other the $x_{n+4}$ signal appearing on line 68. The output of multiplier 66 travels via line 70 to become the other input to the integrator 64. It being noted that the input on line 70 has a weighting of 2. The integrator 64 as will be appreciated performs the plus function in the formula. The output appearing at point (c) on FIG. 3 thus corresponds to the signal required of the correlation circuit means to produce the correct control input information to the gain control means 72.

To proceed through one more correlation stage consider the formula (e) which is somewhat more complex and requires three multiplier outputs to produce the required inputs to the integrator 76. It will be noted that the first input comes from the mutliplier 74 which multiplies $e_n$ by signal $x_n$. The next term required comes from multiplier 62 which as stated previously, multiplies $e_n$ by $x_{n+2}$. Finally the third input to the integrator 76 comes from the multiplier 66 which multiplies $e_n$ by $x_{n+4}$. As will be noted in the FIG. and also in the formula (e), these three inputs are weighted 1, 2 and 3, respectively, which supplies the integer constants within the paranthetical expression. As stated previously, this weighting is built into the input circuit of the integrator itself. Finally the output of integrator 76 is applied as the controlling signal to the gain control means 78 to produce the proper $\Delta g_2$ control setting for said gain control circuitry. The operation of the other integrators may be similarly traced through from the above formulas by referring to the circuit of FIG. 3.

Thus, it may be seen that the embodiment of FIG. 3 operates in a manner similar to that of FIG. 2 with the aforesaid limitations primarily in the exact manner in which the correlation is done and also in the fact that in this embodiment the error signal $e_n$ is correlated with the actual tap voltages or signals rather than the recreated single signal B'.

Experiments have shown that the present circuit similarly produces very rapid convergences aftr initial startup, which for the particular type of partial response coding system involved, is believed to be superior than prior art approaches.

It should also be understood that the partial response channel could be from other than a demodulated transmission line. For example, it could come from a magnetic recording medium wherein the data retrieved is in partial response coded form with potential intersymbol interference or distortion. In this event the present system would receive the output of the magnetic pickup means as its input.

While the invention has been disclosed and described with reference to the particular embodiments of FIGS. 2 and 3 and more particularly with the size or number of taps of the specific delay lines shown, it will be apparent to those skilled in the art that a number of changes could be made by a person skilled in the art without departing from the spirit and scope of the present invention.

What is claimed is:

1. A transversal filter equalizer adapted to be connected to a source of partial response coded data wherein said data contains distortion, said equalizer filter comprising:
- a multi-tap delay line having tap points spaced one bit width apart;
- means for applying input signals in partial response coded form to one end of said delay line;
- adjustable gain means connected between said tap points and to either end of said delay line;
- means for summing the outputs of all the adjustable gain means;
- detection means having an output for converting partial response coded data obtained from said summing means to binary data;
- means for developing an error signal by re-creating a partial response coded signal from the output of said detection means and for comparing said re-created signal with the signal appearing at the input to said detection means;
- correlation means utilizing as one input siad error signal; and
- means connecting the output of said correlation means to control said adjustable means connected to said tap points.

2. A transversal filter equalizer as set forth in claim 1 wherein said correlation means includes means for multiplying said error signal with a re-created precoded signal developed from the output of said detection means.

3. A transversal filter equalizer as set forth in claim 1 wherein said correlation means includes means for multiplying said error signal with the signal appearing directly on the tap points of said delay line in response to said input signals being applied to one end of said delay line.

4. A transversal filter equalizer for use with a partial response channel comprising:
- a multi-tap delay line having an input at one end thereof;
- means for supplying signals in partial response coded form to said input of said delay line;
- adjusted gain means connected to selected tap points of said delay line;
- summing means connected to the outputs of all of said adjusted gain means, the output of said summing means comprising the output of said delay line;
- the tap points of said delay line being spaced one bit width apart;
- detector means coupled to the output of said delay line to convert partial response coded data at its input into conventional binary data format;
- first means connected to the output of said detector means for converting the binary data from the detector into a precoded data format and second means connected to the output of said first connecting means for converting said precoded data format into a partial response coded format;
- error detection means for detecting the difference between the converted partial response coded data signal from the second converting means and the partial response coded data received from the output of said delay line to produce an error signal;
- correlation means utilizing the error signal to provide a plurality of control signals for controlling the settings of each of said adjustable gain means, whereby the control signal from the correlation means to said adjustable gain means approximates the inverse of the partial response characteristic $1-D^2$ wherein $D=z^{-1}$ in z-transform notation.

5. A transversal filter equalizer as set forth in claim 4 wherein said correlation means comprises:
- M multipliers and M integrators,
- means for supplying the error signal and a signal derived from the directly received data to each multiplier, and
- means for supplying linear combinations of the mutliplier outputs to said integrators.

6. A transversal filter equalizer as set forth in claim 5 including a signal ambiguity resolving circuit which comprises:
- two level detection circuits for detecting whether the magnitude of a given signal appearing at the input of the detection means is greater than one-half of either the maximum positive or negative signal value of a normally received signal set;
- the output of said comparison circuits being fed respectively, to one input of an OR gate and an AND gate;
- the other input to said OR gate comprising the output of modulo-2 adder in the first converting circuit means;
- the output of said OR gate providing the other input to said AND gate, the output of said AND gate being the desired precoded signal set from said first converting circuit means.

7. A transversal filter equalizer as set forth in claim 5 wherein said delay line comprises M tap points;
- M adjustable gain control means located between said M tap points and the output of said delay line;
- said correlation circuits means comprising said M integrators and M multipliers wherein one input to each multiplier emanates from said error signal (e) generating means and the other input is the precoded signal (b) from said second converting circuit means;
- means connecting the output of at least one of said multipliers to the input to each of said integration circuit means; and
- means connecting the output of each said integrator to control the gain setting of said adjustable gain means.

8. A transversal filter equalizer as set forth in claim 7 wherein the output $q_i$ from the $i^{th}$ multiplier is defined as the product of $b_n \cdot 1_{n+i}$; where $i \leq 0$, and as the product of $b_{n+i} \cdot 1_n$; where $i > 0$, and wherein the input to the $i^{th}$ integrator is defined as the summation of $$q_i + q_{i-2} + q_{i-4} \ldots q_{i-2j}$$

wherein $j \leq (i+F)/2$; where $F$ is the number of taps on the delay line ahead of the principal tap.

9. A transversal filter equalizer as set forth in claim 7 wherein the output $q_i$ from the $i^{th}$ multiplier is defined as the product of $e_n \cdot x_{n-i+2}$ and wherein the input to the $i^{th}$ integrator is defined by the summation of:

$$q_i + 2q_{i-2} + 3q_{i-4} + 4q_{i-6} \ldots jq_{i-2j+2}$$

where $j \leq (i + F + 2)/2$ and where there are $F+2$ taps ahead of the principal tap.

10. A transversal filter equalizer as set forth in claim 5 wherein said delay line comprises $N$ tap points separated by one bit width;

M adjustable gain control means conntected to the last M tap points of said delay line relative to the input end of said delay line wherein $M = N-2$;

means connecting the output of said adjustable gain means to the output of said delay line;

means for supplying the generated error signal as one input to each of said $M$ multipliers;

means for supplying to the $i^{th}$ multiplier the signal appearing on the $i^{th}$ tap point of said delay line, means connecting the output of at least the $i^{th}$ multiplier to the $i^{th}$ integrator with an input weighting of 1, and means connecting the output of the $i^{th}$ integrator of said M integrators to the $i^{th}$ adjustable gain control means which in turn adjusts the gain of the $(i+2)^{th}$ tap of said delay line.

* * * * *